(12) United States Patent
Nakanishi et al.

(10) Patent No.: US 12,269,460 B2
(45) Date of Patent: Apr. 8, 2025

(54) CONTROLLER AND CONTROL METHOD FOR HYBRID ELECTRIC VEHICLE

(71) Applicant: TOYOTA JIDOSHA KABUSHIKI KAISHA, Aichi-ken (JP)

(72) Inventors: Naoki Nakanishi, Nagoya (JP); Masato Yoshikawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 301 days.

(21) Appl. No.: 18/170,538

(22) Filed: Feb. 17, 2023

(65) Prior Publication Data

US 2023/0264683 A1 Aug. 24, 2023

(30) Foreign Application Priority Data

Feb. 24, 2022 (JP) .................................. 2022-026705

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 2510/0275; B60W 2510/0291; B60W 2510/0638; B60W 2030/206; B60W 2030/203; B60W 2510/083; B60W 2510/1015; B60W 2710/06
(Continued)

(56) References Cited

U.S. PATENT DOCUMENTS 9,086,045 B2 * 7/2015 Wang .................... B60W 20/40
11,479,237 B2 * 10/2022 Nakano ................. B60W 20/40
(Continued)

FOREIGN PATENT DOCUMENTS

| JP | 2003-200758 A | 7/2003 |
| JP | 2003-348708 A | 12/2003 |

(Continued)

*Primary Examiner* — Roger L Pang
(74) *Attorney, Agent, or Firm* — HAUPTMAN HAM, LLP

(57) ABSTRACT

A controller is employed in a vehicle including an engine, a motor generator, and a hydraulically-driven clutch. The controller includes a CPU that executes: a first starting process that starts, when starting the engine under a condition in which a system shaft torque is less than a shaft torque determination value, combustion in the engine after increasing an engine rotation speed to a motor rotation speed by engaging the clutch; a second starting process that starts, when starting the engine under a condition in which the system shaft torque is greater than or equal to the shaft torque determination value, combustion in the engine after the crankshaft starts to be rotated by engaging the clutch, the combustion being started before the engine rotation speed reaches the motor rotation speed; and a setting process that sets the shaft torque determination value to be larger as an oil temperature becomes lower.

4 Claims, 4 Drawing Sheets

(51) Int. Cl.
*B60W 10/06* (2006.01)
*B60W 10/08* (2006.01)
*B60W 30/20* (2006.01)

(52) U.S. Cl.
CPC ............... *B60W 2030/206* (2013.01); *B60W 2510/0275* (2013.01); *B60W 2510/0291* (2013.01); *B60W 2510/0638* (2013.01); *B60W 2510/083* (2013.01); *B60W 2510/1015* (2013.01); *B60W 2710/06* (2013.01)

(58) Field of Classification Search
USPC ........................................ 701/22, 113; 477/5
See application file for complete search history.

(56) References Cited

U.S. PATENT DOCUMENTS

2016/0031435 A1* 2/2016 Gibson ................ B60K 6/387
  180/65.265
2021/0300331 A1 9/2021 Nakanishi et al.

FOREIGN PATENT DOCUMENTS

| JP | 2013-095161 | A | 5/2013 |
| JP | 2016175544 | A | 10/2016 |
| JP | 201925985 | A | 2/2019 |
| JP | 2021-160404 | A | 10/2021 |

\* cited by examiner

CONTROLLER AND CONTROL METHOD FOR HYBRID ELECTRIC VEHICLE

RELATED APPLICATIONS

The present application claims priority of Japanese Patent Application No. 2022-026705 filed Feb. 24, 2022, the disclosure of which is hereby incorporated by reference herein in its entirety.

BACKGROUND

1. Field

The present disclosure relates to a controller and a control method for a hybrid electric vehicle.

2. Description of Related Art

Japanese Laid-Open Patent Publication No. 2019-25985 discloses a controller employed in a hybrid electric vehicle. The hybrid electric vehicle includes an engine and a motor generator as a power source. The hybrid electric vehicle further includes a clutch between an engine and a motor generator. To start the engine, the controller engages the clutch to couple a crankshaft of the engine to a driving shaft of the motor generator. This allows the crankshaft to be rotated by driving the motor generator. After rotating the crankshaft by driving the motor generator, the controller causes combustion to be started in the engine. The combustion is started before an engine rotation speed reaches a motor rotation speed.

In the case of starting the engine as described above, an engagement force of the clutch is adjusted after the combustion starts in the engine, thereby limiting situations in which the motor rotation speed is abruptly increased by an increase in an output torque of the engine that results from the engine start. By limiting an abrupt increase in the motor rotation speed, the occurrence of vibration of the hybrid electric vehicle that results from the engine start is limited. However, in a case in which the clutch is a hydraulically-driven clutch, the responsivity of hydraulic pressure supplied to the clutch becomes lower as the temperature of the hydraulic oil of the clutch becomes lower and the viscosity of the hydraulic oil becomes higher. Thus, it is difficult to properly adjust the engagement force of the clutch. If the engagement force cannot be properly adjusted, the output torque of the engine input to the driving shaft through the clutch from the crankshaft cannot be properly adjusted. Accordingly, the motor rotation speed may increase abruptly. In this case, vibration from the engine start may occur in the hybrid electric vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above problem, a first aspect of the present disclosure provides a controller for a hybrid electric vehicle. The hybrid electric vehicle includes an engine and a motor generator as a power source. The engine includes a crankshaft. The motor generator includes a driving shaft. The hybrid electric vehicle further includes a hydraulically-driven clutch between the crankshaft and the driving shaft. The controller includes circuitry that controls the engine, the motor generator, and the clutch. The circuitry is configured to execute: a first starting process that starts, when starting the engine under a condition in which a system shaft torque is less than a shaft torque determination value, combustion in the engine after increasing an engine rotation speed to a motor rotation speed by engaging the clutch, the system shaft torque being a shaft torque of the driving shaft, the engine rotation speed being a rotation speed of the crankshaft, and the motor rotation speed being a rotation speed of the driving shaft; a second starting process that starts, when starting the engine under a condition in which the system shaft torque is greater than or equal to the shaft torque determination value, combustion in the engine after the crankshaft starts to be rotated by engaging the clutch, the combustion being started before the engine rotation speed reaches the motor rotation speed; and a setting process that sets the shaft torque determination value to be larger as an oil temperature becomes lower, the oil temperature being a temperature of hydraulic oil of the clutch.

To solve the above problem, a second aspect of the present disclosure provides a control method for a hybrid electric vehicle. The hybrid electric vehicle includes an engine and a motor generator as a power source. The engine includes a crankshaft. The motor generator includes a driving shaft. The hybrid electric vehicle further includes a hydraulically-driven clutch between the crankshaft and the driving shaft. The control method includes: starting, when starting the engine under a condition in which a system shaft torque is less than a shaft torque determination value, combustion in the engine after increasing an engine rotation speed to a motor rotation speed by engaging the clutch, the system shaft torque being a shaft torque of the driving shaft, the engine rotation speed being a rotation speed of the crankshaft, and the motor rotation speed being a rotation speed of the driving shaft; starting, when starting the engine under a condition in which the system shaft torque is greater than or equal to the shaft torque determination value, combustion in the engine after the crankshaft starts to be rotated by engaging the clutch, the combustion being started before the engine rotation speed reaches the motor rotation speed; and setting the shaft torque determination value to be larger as an oil temperature becomes lower, the oil temperature being a temperature of hydraulic oil of the clutch.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for a hybrid electric vehicle 500 according to an embodiment will now be described with reference to FIGS. 1 to 5.

Figure 1:
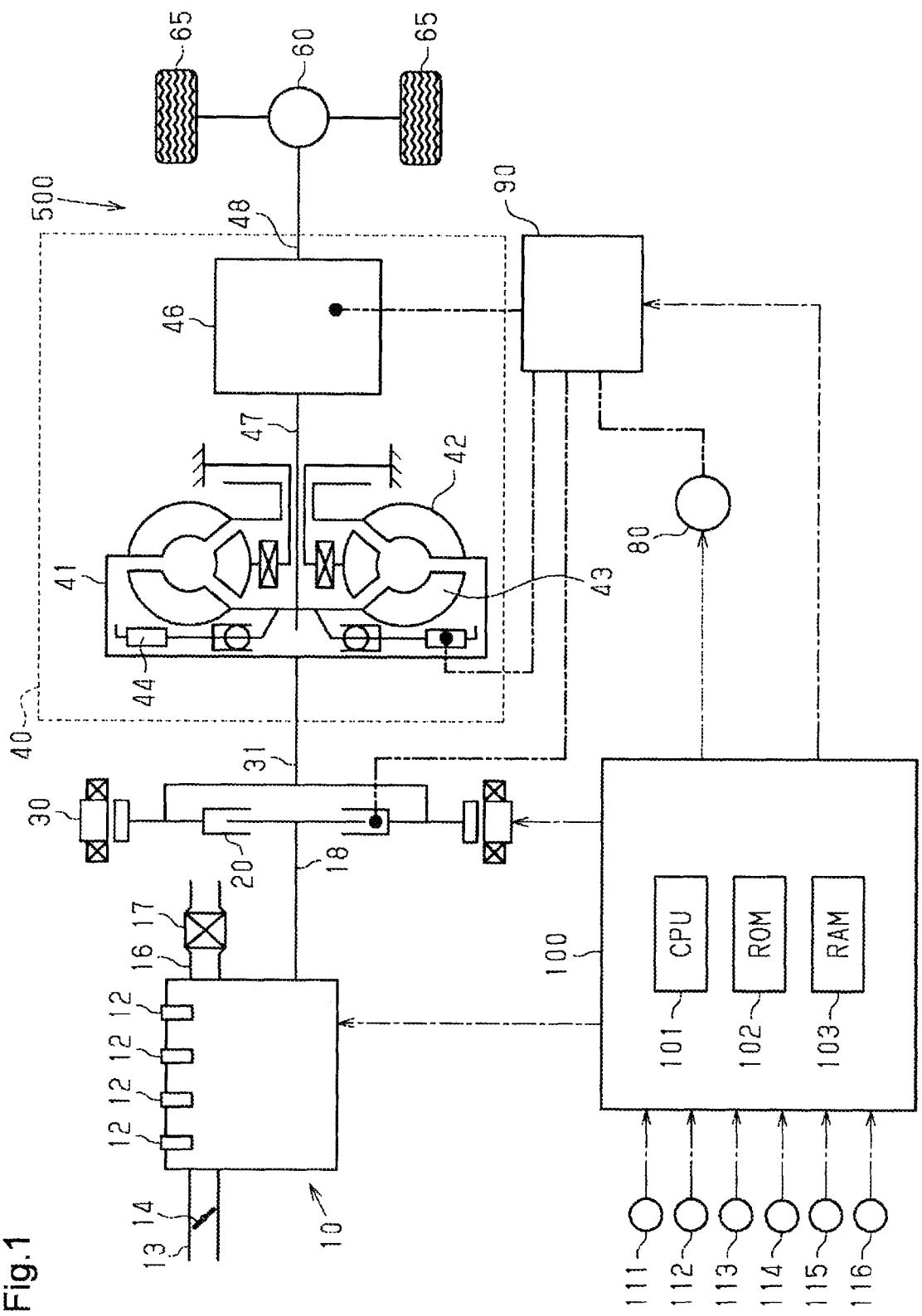
FIG. 1 is a diagram showing the schematic configuration of a hybrid electric vehicle that includes a controller according to an embodiment.

FIG. 1 shows the schematic configuration of the hybrid electric vehicle 500 including the controller 100, which is an example of a controller for a hybrid electric vehicle. The hybrid electric vehicle 500 will be hereinafter simply referred to as the vehicle 500.

Configuration of Vehicle

The vehicle 500 includes an engine 10 and a motor generator 30 as a power source. The vehicle 500 further includes a clutch 20 between the engine 10 and the motor generator 30 on a torque transmission path. Torque output from the engine 10 or the motor generator 30 is transmitted to driven wheels 65 through a transmission 40 and a differential 60. Torque input to the transmission 40 from the power source is referred to as a system shaft torque.

The engine 10 includes fuel injection valves 12, which inject fuel, and cylinders. The engine 10 further includes an intake passage 13, which is connected to the cylinders, and an electronic throttle valve 14, which regulates the amount of air flowing through the intake passage 13. In the cylinders, air-fuel mixture containing the air drawn in from the intake passage 13 and the fuel injected from the fuel injection valves 12 is burned. Burning the air-fuel mixture produces exhaust gas that is discharged from the cylinders to an exhaust passage 16. The exhaust passage 16 includes a catalyst 17 that purifies exhaust gas.

The engine 10 includes a crankshaft 18. The crankshaft 18 is an output shaft of the engine 10. The crankshaft 18 is rotated in a predetermined direction by the force obtained by burning the air-fuel mixture in the cylinders. That is, an engine torque Te, which is an output torque of the engine 10, is output from the crankshaft 18.

The clutch 20 is coupled to the crankshaft 18 of the engine 10. In a state in which the clutch 20 is engaged, torque can be transmitted between the engine 10 and the motor generator 30. In a state in which the clutch 20 is disengaged, torque cannot be transmitted between the engine 10 and the motor generator 30.

In the present embodiment, the engagement of the clutch 20 includes complete engagement and slip engagement. The complete engagement produces a larger engagement force of the clutch 20 than the slip engagement. As the engagement force of the clutch 20 becomes larger, a torque capacity Tc of the clutch 20 becomes larger. Thus, when the clutch 20 is completely engaged, the efficiency of transmitting torque between the engine 10 and the motor generator 30 is relatively high. The slip engagement of the clutch 20 produces a smaller torque capacity Tc of the clutch 20 than the complete engagement of the clutch 20. Thus, when the clutch 20 is slip-engaged, the efficiency of transmitting torque between the engine 10 and the motor generator 30 is relatively low although the torque is transmitted. That is, the clutch 20 may be slip-engaged to intentionally lower the efficiency of transmitting torque between the engine 10 and the motor generator 30.

The clutch 20 is a hydraulically-driven clutch. In such a clutch 20, as a clutch hydraulic pressure Pc, which is the hydraulic pressure supplied to the clutch 20, becomes higher, the engagement force of the clutch 20 becomes larger. That is, adjusting the clutch hydraulic pressure Pc allows for slip engagement of the clutch 20 or complete engagement of the clutch 20. Since the torque capacity Tc of the clutch 20 becomes larger as the clutch hydraulic pressure Pc becomes higher, the efficiency of transmitting torque between the engine 10 and the motor generator 30 becomes higher. That is, in a state in which the clutch 20 is engaged, adjusting the clutch hydraulic pressure Pc changes the torque capacity Tc and consequently adjusts the efficiency of transmitting torque of the clutch 20.

The motor generator 30 includes a driving shaft 31 coupled to the clutch 20. That is, when the motor generator 30 functions as an electric motor, the driving shaft 31 is rotated by the electric power supplied from a battery via an inverter. When the motor generator 30 functions as a power generator, regenerative electric power corresponding to the rotation of the driving shaft 31 is generated in the motor generator 30 so that the regenerative electric power is supplied to the battery via the inverter. The output torque of the motor generator 30 is referred to as a motor torque Tm. The engine torque Te includes torque input to the driving shaft 31 through the clutch 20 from the crankshaft 18 and the motor torque Tm. The sum of that torque and the motor torque Tm is referred to as a system shaft torque Tsys.

The transmission 40 includes a torque converter 41 and a transmission mechanism 46. The torque converter 41 includes a pump impeller 42, a turbine impeller 43, and a lock-up clutch 44. The pump impeller 42 is coupled to the driving shaft 31 of the motor generator 30. The turbine impeller 43 is coupled to the transmission mechanism 46. When the lock-up clutch 44 is disengaged, the hydraulic oil in the torque converter 41 causes torque to be transmitted from the pump impeller 42 to the turbine impeller 43. When the lock-up clutch 44 is engaged, torque is directly transmitted from the pump impeller 42 to the turbine impeller 43 without relying on the hydraulic oil.

The transmission mechanism 46 is, for example, a multi-speed transmission mechanism. The transmission mechanism 46 includes an input shaft 47, to which torque is input from the torque converter 41, and an output shaft 48, which outputs torque. The input shaft 47 is coupled to the turbine impeller 43 of the torque converter 41. The transmission mechanism 46 decelerates the torque input from the input shaft 47 and then outputs the decelerated torque from the output shaft 48 to the differential 60.

In the present embodiment, the vehicle 500 includes an electric pump 80 and a hydraulic control circuit 90. The electric pump 80 pressurizes hydraulic oil and supplies the oil to the hydraulic control circuit 90. The hydraulic control circuit 90 supplies the transmission mechanism 46, the torque converter 41, and the clutch 20 with the high-pressure hydraulic oil that has been supplied from the electric pump 80. For example, the hydraulic control circuit 90 includes oil control valves. By controlling the oil control valves, the supplying and discharging of hydraulic oil to and from a target to be supplied with hydraulic oil is controlled, and the hydraulic pressure of hydraulic oil supplied to a supply target is controlled. That is, the hydraulic control circuit 90 is configured to adjust the clutch hydraulic pressure Pc.

Detection System of Vehicle

The detection system of the vehicle 500 includes sensors that output detection signals corresponding to detection results to the controller 100. That is, the vehicle 500 includes a crank angle sensor 111, an air flow meter 112, an accelerator open degree sensor 113, a motor angle sensor 114, an input shaft sensor 115, and an oil temperature sensor 116. The crank angle sensor 111 outputs a detection signal corresponding to an engine rotation speed Ne, which is the rotation speed of the crankshaft 18. The air flow meter 112 detects an intake air amount GA, which is the amount of air flowing through the intake passage 13, and outputs a detection signal corresponding to the detection result. The accelerator open degree sensor 113 detects an accelerator open degree ACCP, which is the operation amount of the accelerator pedal, and outputs a detection signal corresponding to the detection result. The motor angle sensor 114 outputs a detection signal corresponding to a motor rotation speed Nm, which is the rotation speed of the driving shaft 31 of the motor generator 30. The input shaft sensor 115 outputs a detection signal corresponding to an input shaft rotation speed Nat, which is the rotation speed of the input shaft 47 of the transmission mechanism 46. The oil temperature sensor 116 detects an oil temperature TOIL, which is the temperature of hydraulic oil discharged out of the electric pump 80, and outputs a detection signal corresponding to the detection result.

Controller

The controller 100 includes a CPU 101, a ROM 102, and a RAM 103. The ROM 102 stores various control programs executed by the CPU 101. The RAM 103 stores the results of calculation performed by the CPU 101. The CPU 101 executes the control programs so as to control the engine 10 and the motor generator 30. Further, the CPU 101 controls the electric pump 80 and the hydraulic control circuit 90 so as to control the clutch 20 and the transmission 40. Thus, the CPU 101 corresponds to an execution device in the present embodiment.

The CPU 101 calculates the engine rotation speed Ne based on a detection signal Scr of the crank angle sensor 111. The CPU 101 calculates an engine load factor KL based on the engine rotation speed Ne and the intake air amount GA.

The CPU 101 obtains a torque request value TsR, which is a request value of torque for the power source, based on the accelerator open degree ACCP. The torque request value TsR refers to a request value of torque input to the transmission 40 from the driving shaft 31. For example, the CPU 101 sets the torque request value TsR to be larger as the accelerator open degree ACCP becomes larger. The CPU 101 controls the power source (i.e., the engine 10 and the motor generator 30) based on the torque request value TsR.

Traveling modes of the vehicle 500 include an electric traveling mode and a hybrid traveling mode. Of the engine 10 and the motor generator 30, the electric traveling mode causes only the motor generator 30 to output torque. Thus, when the electric traveling mode is selected, the CPU 101 controls the motor generator 30 based on the torque request value TsR. When the electric traveling mode is selected, the engine 10 is not operated and thus the CPU 101 causes the clutch 20 to be disengaged.

The hybrid traveling mode causes both the engine 10 and the motor generator 30 to output torque. When the engine 10 is operated, the CPU 101 controls the engine 10 and the motor generator 30 based on the torque request value TsR with the clutch 20 engaged. When the hybrid traveling mode is selected, the CPU 101 may intermittently stop the operation of the engine 10. In this case, the CPU 101 controls the motor generator 30 based on the torque request value TsR with the clutch 20 disengaged.

When the operation of the engine 10 is stopped under a condition in which the hybrid traveling mode is selected, the CPU 101 may cause the engine 10 to start operating after the torque request value TsR is increased by, for example, an increase in the accelerator open degree ACCP. In this case, the CPU 101 engages the clutch 20 in addition to starting the engine 10. In the present embodiment, when starting the engine 10, the CPU 101 selects a first starting process or a second starting process and starts the engine 10 by executing the selected process.

Figure 2:
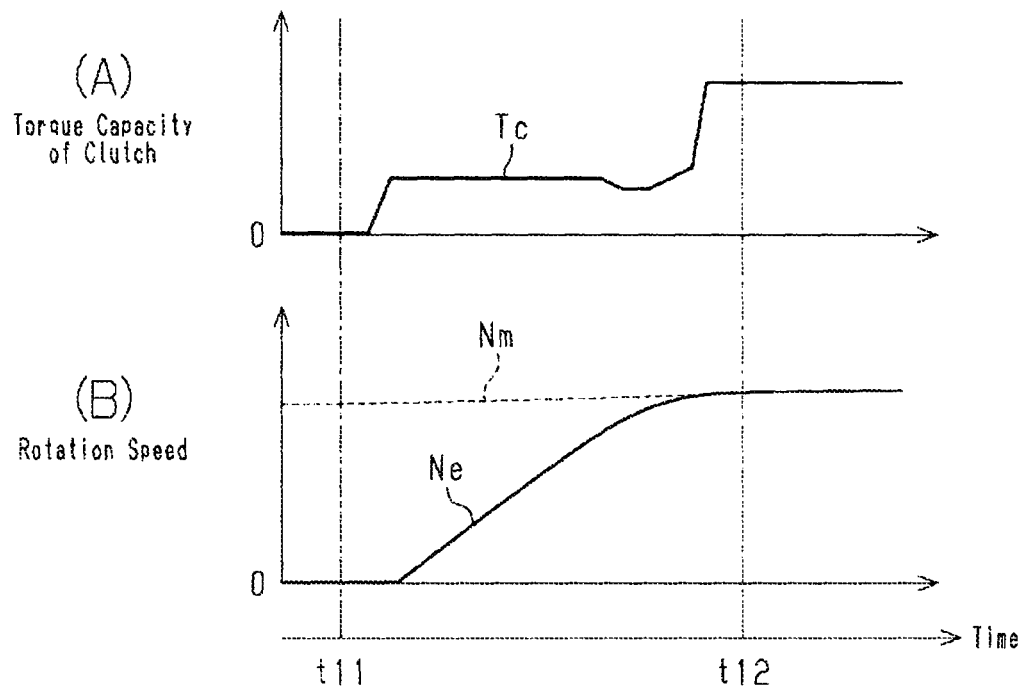
FIG. 2 is a timing diagram in a case in which the engine is started with the first starting process.

The first starting process will now be described with reference to FIG. 2.

In the first starting process, when the starting of the engine 10 is requested at time t11, the clutch 20 is engaged. In this case, the clutch 20 is slip-engaged. The CPU 101 controls the electric pump 80 and the hydraulic control circuit 90 so as to increase the clutch hydraulic pressure Pc, thereby increasing the engagement force of the clutch 20. As the engagement force becomes larger, the torque capacity Tc of the clutch 20 becomes larger as shown in section (A) of FIG. 2. When the clutch 20 is slip-engaged, the motor torque Tm is input to the crankshaft 18. This causes the motor generator 30 to crank the engine 10. Thus, the engine rotation speed Ne becomes higher as shown in section (B) of FIG. 2. Then, the engine rotation speed Ne increases to the motor rotation speed Nm. This increases the clutch hydraulic pressure Pc and thus increases the torque capacity Tc of the clutch 20. As a result, the clutch 20 is completely engaged.

The time at which the engine rotation speed Ne becomes substantially equal to the motor rotation speed Nm is referred to as a synchronization time of the clutch 20. Combustion in the engine 10 is started at the synchronization time of the clutch 20 or at time t12, which is slightly later than the synchronization time. That is, combustion in the engine 10 is started after the clutch 20 is completely engaged.

Figure 3:
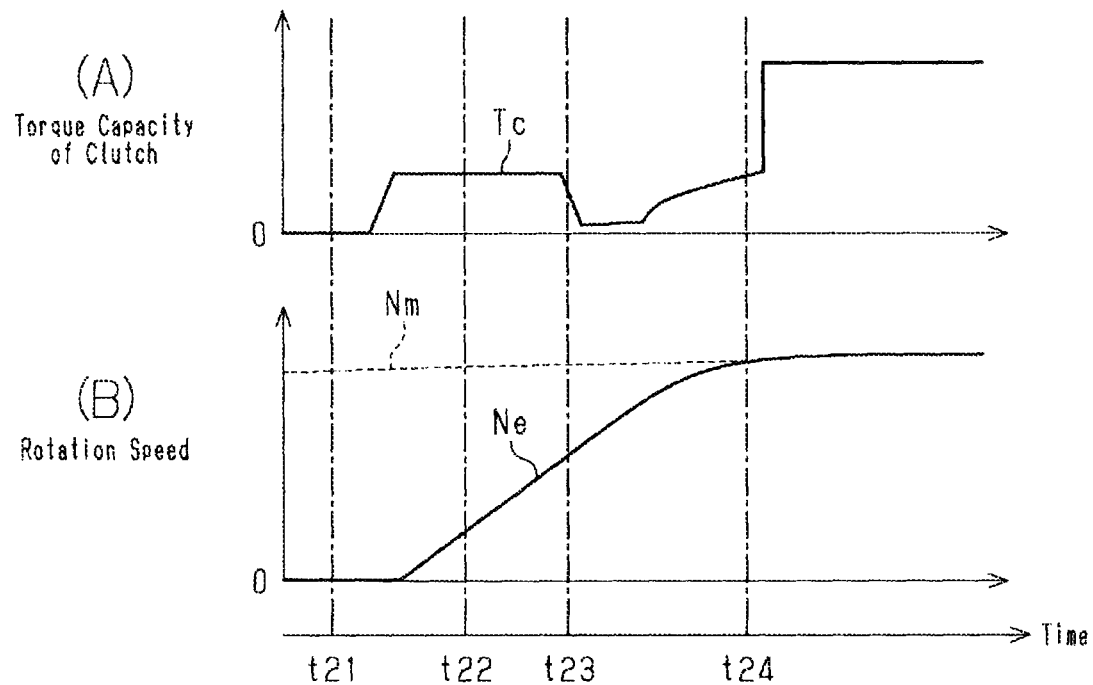
FIG. 3 is a timing diagram in a case in which the engine is started with the second starting process.

The second starting process will now be described with reference to FIG. 3.

In the second starting process, when the starting of the engine 10 is requested at time t21, the clutch 20 is engaged. In this case, the clutch 20 is slip-engaged. The CPU 101 controls the electric pump 80 and the hydraulic control circuit 90 so as to increase the clutch hydraulic pressure Pc, thereby increasing the engagement force of the clutch 20. As the engagement force becomes larger, the torque capacity Tc of the clutch 20 becomes larger as shown in section (A) of FIG. 3. When the clutch 20 is slip-engaged, the motor torque Tm is input to the crankshaft 18. This causes the motor generator 30 to crank the engine 10. Thus, the engine rotation speed Ne becomes higher as shown in section (B) of FIG. 3.

The second starting process is different from the first starting process in that combustion in the engine 10 is started at time t22, which is before the engine rotation speed Ne reaches the motor rotation speed Nm. In the present embodiment, combustion in the engine 10 is started at a time when the crankshaft 18 is rotated once or at a time when the crankshaft 18 is rotated twice by cranking performed by the motor generator 30.

Thus, subsequent to time t22, the engine rotation speed Ne is abruptly increased both by the cranking performed by the motor generator 30 and by an increase in the engine torque Te. Upon start of the engine 10, the torque capacity Tc of the clutch 20 is adjusted before the engine rotation speed Ne reaches the motor rotation speed Nm. That is, the CPU 101 controls the hydraulic control circuit 90 so as to decrease the clutch hydraulic pressure Pc. As a result, the torque capacity Tc of the clutch 20 decreases from time t23. When the torque capacity Tc decreases, the torque transmitted to the driving shaft 31 through the clutch 20 from the crankshaft 18 becomes smaller. This lowers the torque transmission efficiency of the clutch 20. Thus, during the period from when combustion is started in the engine 10 to when the engine rotation speed Ne reaches the motor rotation speed Nm, the torque capacity Tc of the clutch 20 is adjusted so as to adjust the engine torque Te transmitted to the driving shaft 31. This limits an abrupt increase in the motor rotation speed Nm.

At time t24, when the engine rotation speed Ne becomes substantially equal to the motor rotation speed Nm, the CPU 101 controls the hydraulic control circuit 90 so as to increase the clutch hydraulic pressure Pc. As a result, the torque capacity Tc of the clutch 20 increases as shown in section (B) of FIG. 3. This causes the clutch 20 to be completely engaged and thus maximizes the torque transmission efficiency of the clutch 20.

Processes Executed when Starting Engine

The processes executed by the CPU 101 when starting the engine 10 will now be described with reference to FIG. 4.

Figure 4:
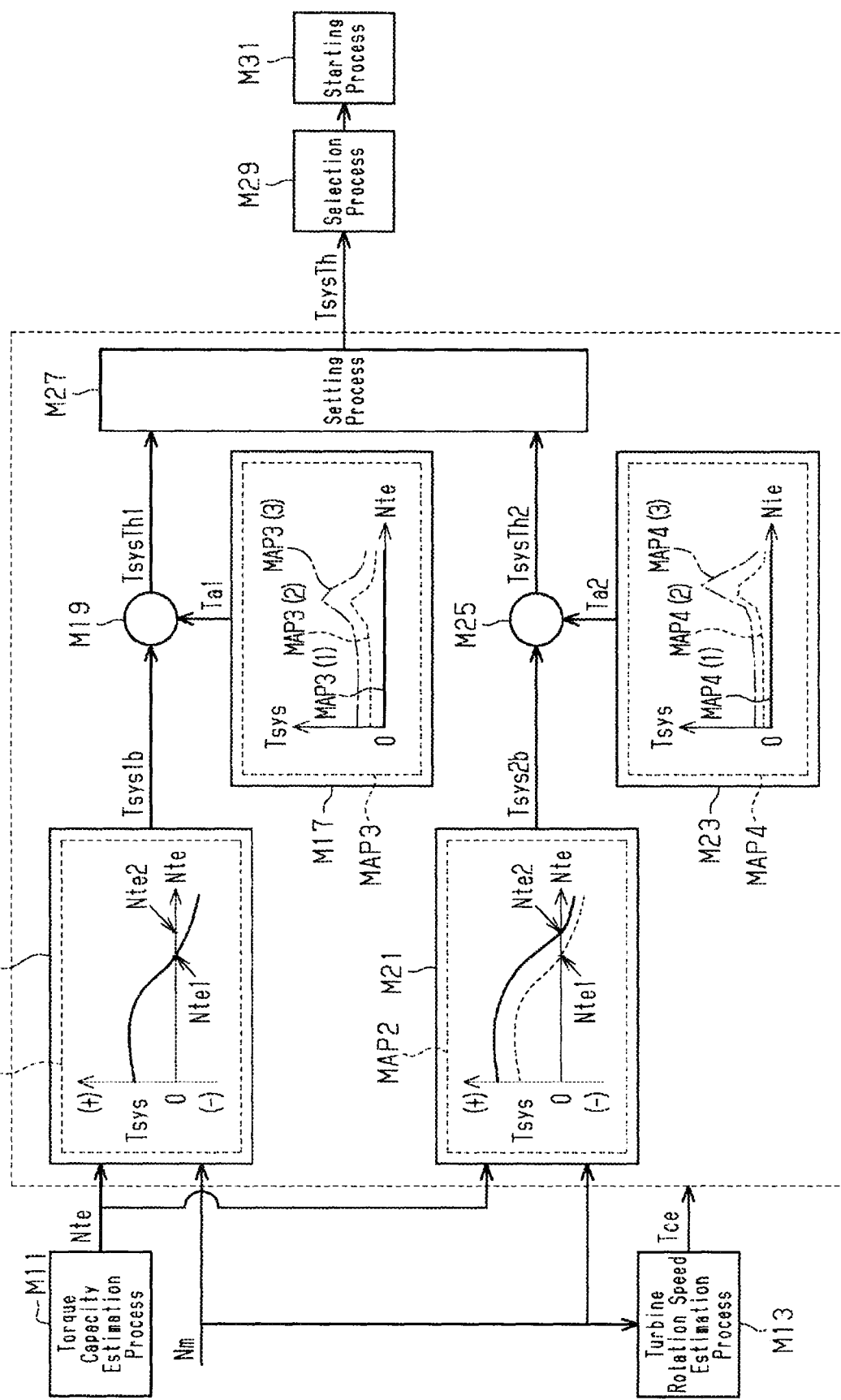
FIG. 4 is a block diagram illustrating multiple processes executed by the CPU of the controller.

As shown in FIG. 4, the CPU 101 executes a torque capacity estimation process M11 and a turbine rotation speed estimation process M13. Further, the CPU 101 executes a first determination value candidate setting process M15, a first correction value obtaining process M17, a first addition process M19, a second determination value candidate setting process M21, a second correction value obtaining process M23, a second addition process M25, and a setting process M27. Furthermore, the CPU 101 executes a selection process M29 and a starting process M31.

Torque Capacity Estimation Process

The torque capacity estimation process M11 is a process that obtains an estimated torque capacity Tce, which is an estimated value of the torque capacity Tc of the clutch 20. The estimated torque capacity Tce refers to the torque capacity Tc obtained at the synchronization time of the clutch 20 if the engine 10 is started with the second starting process. When starting the engine 10 with the second starting process, the CPU 101 adjusts a command value PcTr of the clutch hydraulic pressure Pc in a predefined manner as shown by the solid line in section (D) of FIG. 5, which will be described later. The manner of response of an actual value of the clutch hydraulic pressure Pc to the variations in the command value PcTr as shown by the solid line in section (D) of FIG. 5 can be estimated to a certain extent from the motor rotation speed Nm, the system shaft torque Tsys, and the input shaft rotation speed Nat.

Accordingly, in the torque capacity estimation process M11, the CPU 101 obtains the estimated torque capacity Tce based on the motor rotation speed Nm, the system shaft torque Tsys, and the input shaft rotation speed Nat. For example, it is estimated that the clutch 20 synchronizes later as the motor rotation speed Nm becomes higher. Thus, as the motor rotation speed Nm becomes higher, the CPU 101 sets the estimated torque capacity Tce to be smaller. Further, for example, it is estimated that the clutch 20 synchronizes later as the system shaft torque Tsys becomes larger. Thus, as the system shaft torque Tsys becomes larger, the CPU 101 sets the estimated torque capacity Tce to be smaller. Furthermore, for example, it is estimated that the clutch 20 synchronizes later as the input shaft rotation speed Nat becomes higher. Thus, as the input shaft rotation speed Nat becomes higher, the CPU 101 sets the estimated torque capacity Tce to be smaller.

When the engine 10 is not operating, the clutch 20 is disengaged and thus the CPU 101 obtains the motor torque Tm as the system shaft torque Tsys.

Turbine Rotation Speed Estimation Process

The turbine rotation speed estimation process M13 is a process that obtains an estimated turbine rotation speed Nte, which is an estimated value of the rotation speed of the turbine impeller 43. The rotation speed of the turbine impeller 43 is referred to as the turbine rotation speed. The estimated turbine rotation speed Nte refers to the turbine rotation speed obtained at the synchronization time of the clutch 20 if the engine 10 is started with the second starting process. Since the turbine impeller 43 of the torque converter 41 is coupled to the input shaft 47 of the transmission mechanism 46, the turbine rotation speed is substantially equal to the input shaft rotation speed Nat. That is, when an estimated value of the input shaft rotation speed Nat is referred to as an estimated input shaft rotation speed, the estimated turbine rotation speed Nte corresponds to the estimated input shaft rotation speed.

In the turbine rotation speed estimation process M13, the CPU 101 obtains, as the estimated turbine rotation speed Nte, a value obtained by subtracting a deceleration correction value $\Delta$Nat from the input shaft rotation speed Nat. The deceleration correction value $\Delta$Nat is defined from the particulars of the driving system of the vehicle 500.

First Determination Value Candidate Setting Process

The first determination value candidate setting process M15 refers to a first map MAP1 to obtain a first reference shaft torque determination value Tsys1$b$. The first map MAP1 shows the relationship between the estimated turbine rotation speed Nte and the system shaft torque Tsys. In the first map MAP1, when the estimated turbine rotation speed Nte is less than a first reference rotation speed Nte1, the system shaft torque Tsys corresponding to the estimated turbine rotation speed Nte has a positive value. Specifically, when the estimated turbine rotation speed Nte is less than the first reference rotation speed Nte1, the system shaft torque Tsys corresponding to the estimated turbine rotation speed Nte becomes larger as the estimated turbine rotation speed Nte becomes lower. When the estimated turbine rotation speed Nte is greater than or equal to the first reference rotation speed Nte1, the system shaft torque Tsys corresponding to the estimated turbine rotation speed Nte has a negative value. Specifically, when the estimated turbine rotation speed Nte is greater than or equal to the first reference rotation speed Nte1, the absolute value of the system shaft torque Tsys corresponding to the estimated turbine rotation speed Nte becomes larger as the estimated turbine rotation speed Nte becomes higher.

In the first determination value candidate setting process M15, the CPU 101 refers to the first map MAP1 to obtain the system shaft torque Tsys corresponding to the estimated turbine rotation speed Nte. Then, the CPU 101 sets, as the first reference shaft torque determination value Tsys1b, the system shaft torque Tsys obtained with reference to the first map MAP1.

The first map MAP1 indicates the relationship between the estimated turbine rotation speed Nte and the system shaft torque Tsys in a case in which the oil temperature TOIL is an oil temperature in a first oil temperature region, which will be described later. Further, as will be described in detail later, the first map MAP1 is used when the estimated torque capacity Tce is less than a reference torque capacity Tcb. When the system shaft torque Tsys is greater than or equal to the first reference shaft torque determination value Tsys1b set with reference to the first map MAP1 in a case in which the estimated torque capacity Tce is less than the reference torque capacity Tcb and the oil temperature TOIL is an oil temperature in the first oil temperature region, the occurrence of vibration caused by starting the engine 10 is limited even if the engine 10 is started with the second starting process.

First Correction Value Obtaining Process

The first correction value obtaining process M17 is a process that obtains a first torque correction value Ta1, which is a correction amount of torque corresponding to the oil temperature TOIL. In the first correction value obtaining process M17, the CPU 101 refers to a third map MAP3 to obtain the first torque correction value Ta1. The third map MAP3 shows the relationship between the estimated turbine rotation speed Nte and the system shaft torque Tsys.

In the present embodiment, multiple third maps MAP3 corresponding to the oil temperature TOIL are prepared. In the example shown in FIG. 4, three third maps MAP3 are prepared. Of the three third maps MAP3, a third map MAP3(1) is referred to when the oil temperature TOIL is in the first oil temperature region. A third map MAP3(2) is referred to when the oil temperature TOIL is in a second oil temperature region. A third map MAP3(3) is referred to when the oil temperature TOIL is in a third oil temperature region. Of the three oil temperature regions, the first oil temperature region is a region in which the oil temperature TOIL is the highest. The second oil temperature region is a region between the first oil temperature region and the third oil temperature region. That is, the upper limit of the second oil temperature region is equal to the lower limit of the first oil temperature region. The lower limit of the second oil temperature region is equal to the upper limit of the third oil temperature region.

In the third map MAP3(1), as shown by the solid line in FIG. 4, the system shaft torque Tsys is 0 regardless of the estimated turbine rotation speed Nte. In the third map MAP3(2), as shown by the broken line in FIG. 4, the system shaft torque Tsys changes in correspondence with the estimated turbine rotation speed Nte. In the third map MAP3(3), as shown by the alternate long and short dashed line in FIG. 4, the system shaft torque Tsys changes in correspondence with the estimated turbine rotation speed Nte.

The three third maps MAP3 are created such that the following conditions (A1) and (A2) are satisfied.

(A1) The estimated turbine rotation speed Nte obtained with reference to the third map MAP3(3) is greater than the estimated turbine rotation speed Nte obtained with reference to the third map MAP3(2) and the estimated turbine rotation speed Nte obtained with reference to the third map MAP3(1).

(A2) The estimated turbine rotation speed Nte obtained with reference to the third map MAP3(2) is greater than the estimated turbine rotation speed Nte obtained with reference to the third map MAP3(1).

The first map MAP1 indicates the relationship between the estimated turbine rotation speed Nte and the system shaft torque Tsys in a case in which the oil temperature TOIL is an oil temperature in the first oil temperature region. Thus, the third map MAP3(1) is created as shown by the solid line in FIG. 4. The level of vibration that occurs when the engine 10 is started with the second starting process is limited to an allowable range using the system shaft torque Tsys. The system shaft torque Tsys becomes larger as the oil temperature TOIL becomes lower (i.e., as the viscosity of hydraulic oil becomes higher). Thus, the third map MAP3(2) is created as shown by the broken line in FIG. 4, and the third map MAP3(3) is created as shown by the alternate long and short dashed line in FIG. 4.

In the first correction value obtaining process M17, the CPU 101 selects the third map MAP3 corresponding to the oil temperature TOIL from the three third maps MAP3. For example, when the oil temperature TOIL is an oil temperature in the second oil temperature region, the CPU 101 selects the third map MAP3(2). Subsequently, the CPU 101 refers to the selected third map MAP3 to obtain the system shaft torque Tsys corresponding to the estimated turbine rotation speed Nte. Then, the CPU 101 sets, as the first torque correction value Ta1, the system shaft torque Tsys obtained with reference to the third map MAP3.

First Addition Process

The first addition process M19 is a process that obtains a first shaft torque determination value TsysTh1 by correcting the first reference shaft torque determination value Tsys1b using the first torque correction value Ta1. In the first addition process M19, the CPU 101 obtains, as the first shaft torque determination value TsysTh1, the sum of the first reference shaft torque determination value Tsys1b and the first torque correction value Ta1. That is, the CPU 101 sets the first shaft torque determination value TsysTh1 to be larger as the first torque correction value Ta1 becomes larger.

Second Determination Value Candidate Setting Process

The second determination value candidate setting process M21 refers to a second map MAP2 to obtain a second reference shaft torque determination value Tsys2b. The second map MAP2 shows the relationship between the estimated turbine rotation speed Nte and the system shaft torque Tsys. In the second map MAP2, when the estimated turbine rotation speed Nte is less than a second reference rotation speed Nte2, the system shaft torque Tsys corresponding to the estimated turbine rotation speed Nte has a positive value. Specifically, when the estimated turbine rotation speed Nte is less than the second reference rotation speed Nte2, the system shaft torque Tsys corresponding to the estimated turbine rotation speed Nte becomes larger as the estimated turbine rotation speed Nte becomes lower. When the estimated turbine rotation speed Nte is greater than or equal to the second reference rotation speed Nte2, the system shaft torque Tsys corresponding to the estimated turbine rotation speed Nte has a negative value. Specifically, when the estimated turbine rotation speed Nte is greater than or equal to the second reference rotation speed Nte2, the absolute value of the system shaft torque Tsys corresponding to the estimated turbine rotation speed Nte becomes larger as the estimated turbine rotation speed Nte becomes higher. The value of the second reference rotation speed Nte2 is set to be greater than that of the first reference rotation speed Nte1.

In the second determination value candidate setting process M21, the CPU 101 refers to the second map MAP2 to obtain the system shaft torque Tsys corresponding to the estimated turbine rotation speed Nte. Then, the CPU 101 sets, as the second reference shaft torque determination value Tsys2b, the system shaft torque Tsys obtained with reference to the second map MAP2.

The second map MAP2 indicates the relationship between the estimated turbine rotation speed Nte and the system shaft torque Tsys in a case in which the oil temperature TOIL is an oil temperature in the first oil temperature region. Further, as will be described in detail later, the second map MAP2 is used when the estimated torque capacity Tce is greater than or equal to the reference torque capacity Tcb. When the system shaft torque Tsys is greater than or equal to the first reference shaft torque determination value Tsys1b set with reference to the second map MAP2 in a case in which the estimated torque capacity Tce is greater than or equal to the reference torque capacity Tcb and the oil temperature TOIL is an oil temperature in the first oil temperature region, the occurrence of vibration caused by starting the engine 10 is limited even if the engine 10 is started with the second starting process.

The first reference shaft torque determination value Tsys1b is set by the first determination value candidate setting process M15. The second reference shaft torque determination value Tsys2b is set by the second determination value candidate setting process M21. The first reference shaft torque determination value Tsys1b and the second reference shaft torque determination value Tsys2b are both torques corresponding to the estimated turbine rotation speed Nte. In the present embodiment, the first map MAP1 and the second map MAP2 are created such that the second reference shaft torque determination value Tsys2b is greater than the first reference shaft torque determination value Tsys1b. The broken line in the graph illustrating the second map MAP2 indicates the relationship between the estimated turbine rotation speed Nte and the system shaft torque Tsys in the first map MAP1.

Second Correction Value Obtaining Process

The second correction value obtaining process M23 is a process that obtains a second torque correction value Ta2, which is a correction amount of torque corresponding to the oil temperature TOIL. In the second correction value obtaining process M23, the CPU 101 refers to a fourth map MAP4 to obtain the second torque correction value Ta2. The fourth map MAP4 shows the relationship between the estimated turbine rotation speed Nte and the system shaft torque Tsys.

In the present embodiment, multiple fourth maps MAP4 corresponding to the oil temperature TOIL are prepared. In the example shown in FIG. 4, three fourth maps MAP4 are prepared. Of the three fourth maps MAP4, a fourth map MAP4(1) is referred to when the oil temperature TOIL is in the first oil temperature region. A fourth map MAP4(2) is referred to when the oil temperature TOIL is in the second oil temperature region. A fourth map MAP4(3) is referred to when the oil temperature TOIL is in the third oil temperature region.

In the fourth map MAP4(1), as shown by the solid line in FIG. 4, the system shaft torque Tsys is 0 regardless of the estimated turbine rotation speed Nte. In the fourth map MAP4(2), as shown by the broken line in FIG. 4, the system shaft torque Tsys changes in correspondence with the estimated turbine rotation speed Nte. In the fourth map MAP4(3), as shown by the alternate long and short dashed line in FIG. 4, the system shaft torque Tsys changes in correspondence with the estimated turbine rotation speed Nte.

The three fourth maps MAP4 are created such that the following conditions (B1) and (B2) are satisfied.
(B1) The estimated turbine rotation speed Nte obtained with reference to the fourth map MAP4(3) is greater than the estimated turbine rotation speed Nte obtained with reference to the fourth map MAP4(2) and the estimated turbine rotation speed Nte obtained with reference to the fourth map MAP4(1).
(B2) The estimated turbine rotation speed Nte obtained with reference to the fourth map MAP4(2) is greater than the estimated turbine rotation speed Nte obtained with reference to the fourth map MAP4(1).

The second map MAP2 indicates the relationship between the estimated turbine rotation speed Nte and the system shaft torque Tsys in a case in which the oil temperature TOIL is an oil temperature in the first oil temperature region. Thus, the fourth map MAP4(1) is created as shown by the solid line in FIG. 4. The level of vibration that occurs when the engine 10 is started with the second starting process is limited to an allowable range using the system shaft torque Tsys. The system shaft torque Tsys becomes larger as the oil temperature TOIL becomes lower (i.e., as the viscosity of hydraulic oil becomes higher). Thus, the fourth map MAP4(2) is created as shown by the broken line in FIG. 4 and the fourth map MAP4(3) is created as shown by the alternate long and short dashed line in FIG. 4.

In the second correction value obtaining process M23, the CPU 101 selects the fourth map MAP4 corresponding to the oil temperature TOIL from the three fourth maps MAP4. For example, when the oil temperature TOIL is an oil temperature in the third oil temperature region, the CPU 101 selects the fourth map MAP4(3). Subsequently, the CPU 101 refers to the selected fourth map MAP4 to obtain the system shaft torque Tsys corresponding to the estimated turbine rotation speed Nte. Then, the CPU 101 sets, as the second torque correction value Ta2, the system shaft torque Tsys obtained with reference to the fourth map MAP4.

Second Addition Process

The second addition process M25 is a process that obtains a second shaft torque determination value TsysTh2 by correcting the second reference shaft torque determination value Tsys2b using the second torque correction value Ta2. In the second addition process M25, the CPU 101 obtains, as the second shaft torque determination value TsysTh2, the sum of the second reference shaft torque determination value Tsys2b and the second torque correction value Ta2. That is, the CPU 101 sets the second shaft torque determination value TsysTh2 to be larger as the second torque correction value Ta2 becomes larger.

Setting Process

The setting process M27 is a process that sets one of the first shaft torque determination value TsysTh1 and the second shaft torque determination value TsysTh2 as a shaft torque determination value TsysTh. In the setting process M27, the CPU 101 sets the shaft torque determination value TsysTh based on the estimated torque capacity Tce. Specifically, when the estimated torque capacity Tce is less than the reference torque capacity Tcb, the CPU 101 sets the first shaft torque determination value TsysTh1 as the shaft torque determination value TsysTh. When the estimated torque capacity Tce is greater than or equal to the reference torque capacity Tcb, the CPU 101 sets the second shaft torque determination value TsysTh2 as the shaft torque determination value TsysTh. Thus, the shaft torque determination value TsysTh is set to be larger when the estimated torque capacity Tce is relatively large than when the estimated torque capacity Tce is relatively small. That is, the reference torque capacity Tcb corresponds to a torque capacity determination value.

Selection Process

The selection process M29 is a process that selects one of the first starting process and the second starting process as a starting process for the engine 10. In the selection process M29, when the system shaft torque Tsys is greater than or equal to the shaft torque determination value TsysTh, the CPU 101 selects the second starting process. When the system shaft torque Tsys is less than the shaft torque determination value TsysTh, the CPU 101 selects the first starting process.

Starting Process

The starting process M31 is a process that starts the engine 10 when the starting of the engine 10 is requested. When selecting the first starting process in the selection process M29, the CPU 101 executes the first starting process. When selecting the second starting process in the selection process M29, the CPU 101 executes the second starting process.

Operation and Advantages of Present Embodiment

The operation of starting the engine 10 by operating the accelerator pedal will now be described with reference to FIG. 5.

Figure 5:
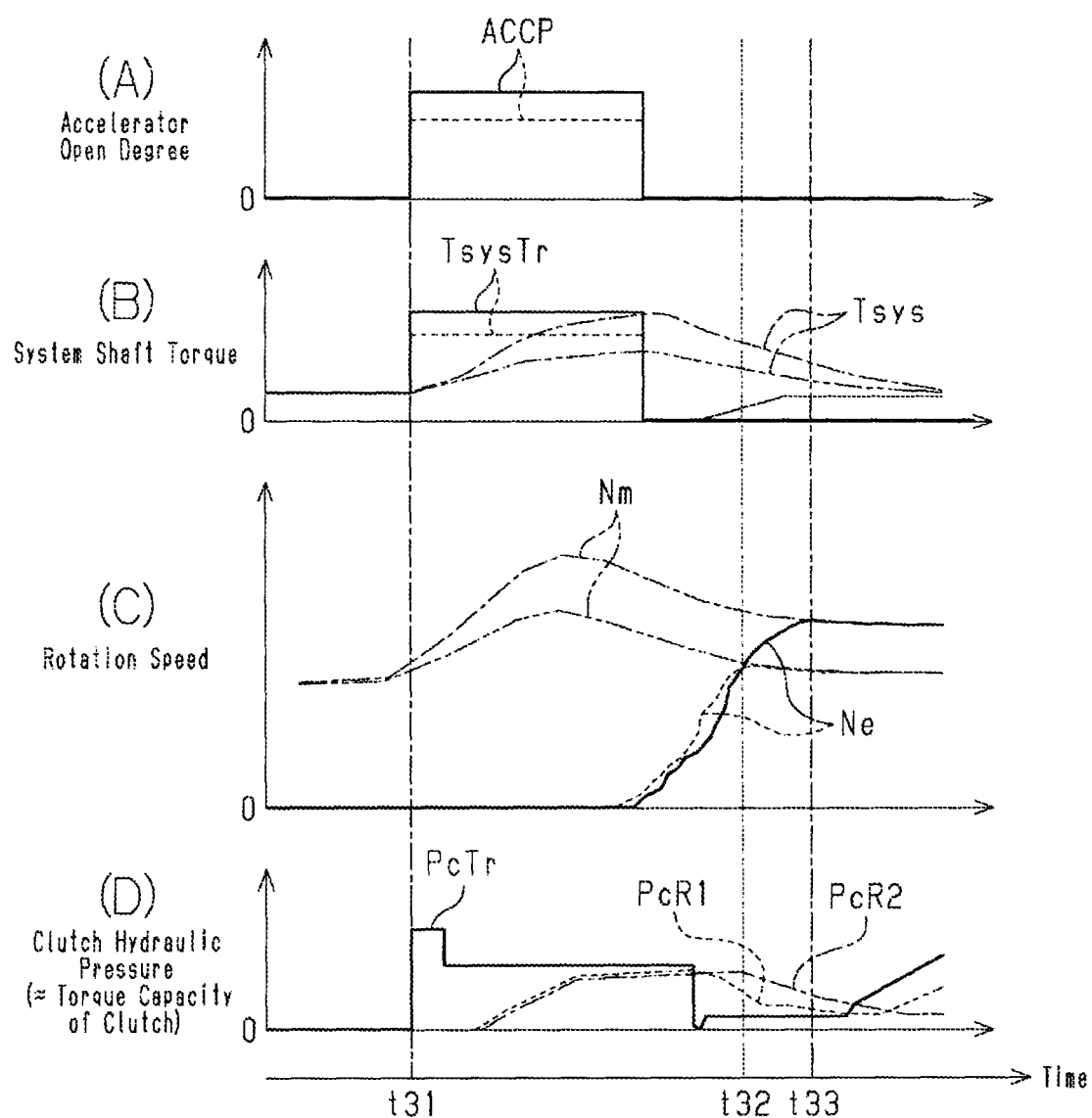
In FIG. 5, section (A) is a timing diagram illustrating changes in the accelerator open degree, section (B) is a timing diagram illustrating changes in the system shaft torque, section (C) is a timing diagram illustrating changes in the engine rotation speed and the motor rotation speed, and section (D) is a timing diagram illustrating changes in the clutch hydraulic pressure.

When the accelerator pedal is operated such that the accelerator open degree ACCP changes as shown by the solid line in section (A) of FIG. 5, a command value TsysTr of the system shaft torque Tsys changes as shown by the solid line in section (B) of FIG. 5. When the accelerator pedal is operated such that the accelerator open degree ACCP changes as shown by the broken line in section (A) of FIG. 5, the command value TsysTr of the system shaft torque Tsys changes as shown by the broken line in section (B) of FIG. 5. The solid line in section (D) of FIG. 5 shows changes in the command value PcTr of the clutch hydraulic pressure used to start the engine 10 with the second starting process. The broken line in section (D) of FIG. 5 shows changes in an actual value PcR1 of the clutch hydraulic pressure Pc at a relatively high oil temperature TOIL when the hydraulic control circuit 90 is activated based on the command value PcTr. The alternate long and short dashed line in section (D) of FIG. 5 shows changes in an actual value PcR2 of the clutch hydraulic pressure Pc at a relatively low oil temperature TOIL when the hydraulic control circuit 90 is activated based on the command value PcTr.

The reason that the vibration caused by starting the engine 10 is more likely to occur when the second starting process is executed than when the first starting process is executed will now be described in detail. Immediately after combustion starts in the engine 10 (specifically, immediately after first combustion in the engine 10), the variations in the engine torque Te and the torque capacity Tc of the clutch 20 tends to vary an increase rate of the engine rotation speed Ne. If the motor rotation speed Nm is sufficiently high, the variations in the increase rate of the engine rotation speed Ne converge and thus the synchronization time of the clutch 20 does not vary significantly. If the motor rotation speed Nm is relatively low, the variations in the increase rate of the engine rotation speed Ne does not easily converge and thus the synchronization time of the clutch 20 tends to vary. The vibration caused by starting the engine 10 can be reduced using the motor torque Tm. However, there is a response delay of detection of the crank angle sensor 111 and the motor angle sensor 114 and a response delay of the motor torque Tm. Thus, the synchronization time of the clutch 20 needs to be estimated based on the increase rate of the engine rotation speed Ne. In the first starting process, since combustion in the engine 10 is not performed prior to the synchronization time, the increase rate of the engine rotation speed Ne is relatively low and does not vary significantly. This allows the synchronization time of the clutch 20 to be estimated accurately. Accordingly, the occurrence of the vibration caused by starting the engine 10 is limited.

In the second starting process, since the increase rate of the engine rotation speed Ne varies, the synchronization time of the clutch 20 cannot be estimated accurately. Thus, the torque capacity Tc of the clutch 20 is temporarily lowered so as to limit the vibration caused by starting the engine 10. Nevertheless, when the second starting process is executed with a relatively small motor torque Tm, the clutch 20 may synchronize at an earlier time than the torque capacity Tc starts to be lowered. In this case, since the torque capacity Tc is lowered later, the starting of the engine 10 produces vibration.

Changes in Accelerator Open Degree ACCP (broken line in section (A) of FIG. 5)

In this case, since the accelerator pedal starts to be operated at time t31, the command value TsysTr of the system shaft torque changes as shown by the broken line in section (B) of FIG. 5. This causes the system shaft torque Tsys to change as shown by the long dashed double-short dashed line in section (B) of FIG. 5. Thus, the motor rotation speed Nm changes as shown by the long dashed double-short dashed line in section (C) of FIG. 5. When the starting of the engine 10 is requested, the second starting process is executed in a case in which the system shaft torque Tsys is greater than or equal to the shaft torque determination value TsysTh. This causes the command value PcTr of the clutch hydraulic pressure to change as shown by the solid line in section (D) of FIG. 5 such that the clutch 20 is slip-engaged. When the oil temperature TOIL is relatively high and the viscosity of the hydraulic oil is relatively low, the actual value PcR1 of the clutch hydraulic pressure changes as shown by the broken line in section (D) of FIG. 5. When the oil temperature TOIL is relatively low and the viscosity of the hydraulic oil is relatively high, the actual value PcR2 of the clutch hydraulic pressure changes as shown by the alternate long and short dashed line in section (D) of FIG. 5. Increases in the actual values PcR1, PcR2 of the hydraulic pressure cause the clutch 20 to be slip-engaged.

When the clutch 20 is slip-engaged, the engine rotation speed Ne starts to be increased through cranking performed by driving the motor generator 30. As a result, combustion in the engine 10 is started. In this case, the engine rotation speed Ne changes as shown by the broken line in section (C) of FIG. 5.

When combustion in the engine 10 is started, the engine torque Te is output from the engine 10. Then, at time t32, the engine rotation speed Ne becomes substantially equal to the motor rotation speed Nm. That is, the time t32 is the synchronization time of the clutch 20.

When combustion in the engine 10 is started, the command value PcTr of the clutch hydraulic pressure decreases so as to lower the torque capacity Tc of the clutch 20. When the oil temperature TOIL is relatively high and the viscosity of the hydraulic oil is relatively low, a decrease in the command value PcTr causes the actual value PcR1 of the clutch hydraulic pressure to start decreasing at a relatively early time as shown by the broken line in section (D) of FIG. 5. At time t32, the actual value PcR1 of the clutch hydraulic pressure is sufficiently low. That is, the torque capacity Tc of the clutch 20 is relatively low at the synchronization time of the clutch 20. This lowers the efficiency of the clutch 20 transmitting the engine torque Te from the crankshaft 18 to the driving shaft 31. Thus, an increase in the motor rotation speed Nm caused by starting the engine 10 is limited. Accordingly, when the engine 10 is started with the second starting process, the occurrence of vibration of the vehicle 500 caused by starting the engine 10 is limited.

In a case in which the oil temperature TOIL is relatively low and the viscosity of the hydraulic oil is relatively high, even when the command value PcTr of the clutch hydraulic pressure decreases as shown by the solid line in section (D) of FIG. 5, the actual value PcR2 changes as shown by the alternate long and short dashed line in section (D) of FIG. 5. That is, as compared with when the oil temperature TOIL is relatively high, the actual value PcR2 of the clutch hydraulic pressure starts decreasing at a later time. At time t32, since the actual value PcR2 of the clutch hydraulic pressure remains relatively high, the torque capacity Tc of the clutch 20 is relatively large. That is, at the synchronization time of the clutch 20, the torque capacity Tc of the clutch 20 is not lowered. Thus, at around time t32, the efficiency of the clutch 20 transmitting the engine torque Te from the crankshaft 18 to the driving shaft 31 is not lowered. Accordingly, an increase in the motor rotation speed Nm caused by a rise in the engine torque Te cannot be limited. Consequently, when the engine 10 is started with the second starting process, the vibration caused by starting the engine 10 occurs in the vehicle 500.

To solve this problem, in the present embodiment, the shaft torque determination value TsysTh is set to be larger when the oil temperature TOIL is relatively low and the viscosity of the hydraulic oil is relatively high than when oil temperature TOIL is relatively high and the viscosity of the hydraulic oil is relatively low. Thus, when the command value TsysTr of the system shaft torque changes as shown by the broken line in section (B) of FIG. 5 under a condition in which the oil temperature TOIL is relatively low, the system shaft torque Tsys does not become greater than or equal to the shaft torque determination value TsysTh. That is, the first starting process is executed as a process that starts the engine 10.

When the first starting process is executed, cranking performed by driving the motor generator 30 increases the engine rotation speed Ne to the motor rotation speed Nm. Then, combustion in the engine 10 is started. Accordingly, although the completion of the starting of the engine 10 is delayed, the occurrence of the vibration of the vehicle 500 caused by starting the engine 10 is limited.

Changes in Accelerator Open Degree ACCP (Solid Line in Section (A) of FIG. 5)

In this case, when the accelerator pedal starts to be operated at time t31, the command value TsysTr of the system shaft torque changes as shown by the solid line in section (B) of FIG. 5. This causes the system shaft torque Tsys to change as shown by the alternate long and short dashed line in section (B) of FIG. 5. Thus, the motor rotation speed Nm changes as shown by the alternate long and short dashed line in section (C) of FIG. 5. When the starting of the engine 10 is requested, the second starting process is executed in a case in which the system shaft torque Tsys is greater than or equal to the shaft torque determination value TsysTh. This causes the command value PcTr of the clutch hydraulic pressure to change as shown by the solid line in section (D) of FIG. 5 such that the clutch 20 is slip-engaged.

When the clutch 20 is slip-engaged, the engine rotation speed Ne starts to be increased through cranking performed by driving the motor generator 30. As a result, combustion in the engine 10 is started. In this case, the engine rotation speed Ne changes as shown by the solid line in section (C) of FIG. 5.

When combustion in the engine 10 is started, the engine torque Te is output from the engine 10. Then, at time t33, the engine rotation speed Ne becomes substantially equal to the motor rotation speed Nm. That is, the time t33 is the synchronization time of the clutch 20.

When combustion in the engine 10 is started, the command value PcTr of the clutch hydraulic pressure decreases so as to lower the torque capacity Tc of the clutch 20. When the oil temperature TOIL is relatively high and the viscosity of the hydraulic oil is relatively low, a decrease in the command value PcTr causes the actual value PcR1 of the clutch hydraulic pressure to start decreasing at a relatively early time as shown by the broken line in section (D) of FIG. 5. Thus, at time t33, the actual value PcR1 of the clutch hydraulic pressure is sufficiently low. That is, the torque capacity Tc of the clutch 20 is relatively low at the synchronization time of the clutch 20. As a result, when the engine 10 is started with the second starting process, the occurrence of vibration of the vehicle 500 caused by starting the engine 10 is limited.

In a case in which the oil temperature TOIL is relatively low and the viscosity of the hydraulic oil is relatively high, even when the command value PcTr of the clutch hydraulic pressure decreases as shown by the solid line in section (D) of FIG. 5, the actual value PcR2 changes as shown by the alternate long and short dashed line in section (D) of FIG. 5. That is, the actual value PcR2 of the clutch hydraulic pressure remains relatively high at time t32, but then the actual value PcR2 becomes relatively low at time t33. The time t33 is the synchronization time of the clutch 20. At time t33, the torque capacity Tc of the clutch 20 is already lowered. As a result, even when the engine 10 is started with the second starting process, the occurrence of vibration of the vehicle 500 caused by starting the engine 10 is limited.

The present embodiment provides the following advantages.

(1) The shaft torque determination value TsysTh is set to be larger as the oil temperature TOIL becomes lower. Thus, when the responsivity of the clutch hydraulic pressure Pc is relatively low because the viscosity of hydraulic oil is relatively high due to a relatively low oil temperature TOIL, the second starting process is not easily executed. When the viscosity of hydraulic oil is relatively high in this manner, starting the engine 10 with the first starting process limits the occurrence of vibration caused by starting the engine 10 although the completion of the starting of the engine 10 is slightly delayed.

When the responsivity of the clutch hydraulic pressure Pc is relatively high because the viscosity of hydraulic oil is relatively low due to a relatively high oil temperature TOIL, the shaft torque determination value TsysTh is set to be relatively small. This allows the second starting process to be easily executed. When the viscosity of hydraulic oil is relatively low, the torque capacity Tc of the clutch 20 is quickly reduced at a relatively early time even by starting the engine 10 with the second starting process because of a relatively high responsivity of the clutch hydraulic pressure Pc. That is, the torque capacity Tc is relatively low at the synchronization time of the clutch 20. Thus, activating the clutch 20 limits situations in which the motor rotation speed Nm increases abruptly even if the engine torque Te abruptly increases upon start of the engine 10. This allows the starting of the engine 10 to be completed at a relatively early time while limiting the occurrence of vibration caused by starting the engine 10. Accordingly, the present embodiment limits the occurrence of vibration caused by starting the engine 10 while also allowing the starting of the engine 10 to be completed at a relatively early time.

(2) When the second starting process is performed to start the engine 10, the level of vibration caused by starting the engine 10 changes depending on the rotation speed of the input shaft 47 of the transmission mechanism 46. Thus, in the present embodiment, the estimated turbine rotation speed Nte is obtained. Further, the shaft torque determination value TsysTh is set based on the estimated turbine rotation speed Nte. By executing the second starting process on condition that the system shaft torque Tsys is greater than or equal to the shaft torque determination value TsysTh, an increase in the level of the vibration caused by starting the engine 10 with the second starting process is limited.

(3) In a case in which the torque capacity Tc of the clutch 20 decreases if the second starting process is performed to start the engine 10, variations in the engine torque Te are easily attenuated by the clutch 20 when the engine torque Te increases abruptly. That is, as the torque capacity Tc becomes smaller if the second starting process is performed to start the engine 10, the vibration caused by starting the engine 10 is less likely to occur in the vehicle 500. Thus, in the present embodiment, the shaft torque determination value TsysTh is set to be larger when the estimated torque capacity Tce is greater than or equal to the reference torque capacity Tcb than when the estimated torque capacity Tce is less than the reference torque capacity Tcb. By executing the second starting process on condition that the system shaft torque Tsys is greater than or equal to the shaft torque determination value TsysTh, an increase in the level of the vibration caused by starting the engine 10 with the second starting process is limited.

(4) The present embodiment allows the shaft torque determination value TsysTh to be set to be smaller when it is estimated that the vehicle 500 is less likely to be vibrated by starting the engine 10 with the second starting process than when it is estimated that the vibration is more likely to occur. Accordingly, when it is estimated that the vehicle 500 is less likely to be vibrated by starting the engine 10 with the second starting process, the second starting process can be executed more often.

Modifications

The above embodiment may be modified as follows. The above embodiment and the following modifications can be combined as long as the combined modifications remain technically consistent with each other.

The shaft torque determination value TsysTh does not have to be varied in correspondence with the estimated torque capacity Tce.

The shaft torque determination value TsysTh does not have to be varied in correspondence with the estimated turbine rotation speed Nte.

There may be multiple first maps MAP1 that correspond to the motor rotation speed Nm. In this case, in the first determination value candidate setting process M15, the first map MAP1 corresponding to the present motor rotation speed Nm is selected from the first maps MAP1. By referring to the selected first map MAP1, the system shaft torque Tsys corresponding to the estimated turbine rotation speed Nte is set as the first reference shaft torque determination value Tsys1b.

There may be multiple second maps MAP2 that correspond to the motor rotation speed Nm. In this case, in the second determination value candidate setting process M21, the second map MAP2 corresponding to the present motor rotation speed Nm is selected from the second maps MAP2. By referring to the selected second map MAP2, the system shaft torque Tsys corresponding to the estimated turbine rotation speed Nte is set as the second reference shaft torque determination value Tsys2b.

In the above embodiment, the electric pump 80 and the hydraulic control circuit 90, which supply the transmission 40 with hydraulic oil, serve as a system of supplying the clutch 20 with hydraulic pressure. Instead, a device that supplies the clutch 20 with hydraulic pressure may be arranged separately from the electric pump 80 and the hydraulic control circuit 90.

A transmission 40 that does not include the torque converter 41 may be used.

A continuously variable transmission mechanism may be used.

The vehicle does not have to include a transmission.

The controller 100 does not have to include circuitry that includes a CPU and a ROM and that is configured to execute software processing. That is, the controller 100 may be modified as long as it has any one of the following configurations (a) to (c):

(a) The controller 100 includes one or more processors that execute various processes in accordance with a computer program. The processor includes a CPU and a memory, such as a RAM and ROM. The memory stores program codes or instructions configured to cause the CPU to execute the processes. The memory, or computer-readable medium, includes any type of medium that is accessible by general-purpose computers and dedicated computers.

(b) The controller 100 includes one or more dedicated hardware circuits that execute various processes. Examples of the dedicated hardware circuits include an application specific integrated circuit (ASIC) and a field programmable gate array (FPGA).

(c) The controller 100 includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hybrid electric vehicle, wherein
the hybrid electric vehicle includes an engine and a motor generator as a power source, the engine including a crankshaft, and the motor generator including a driving shaft, the hybrid electric vehicle further includes a hydraulically-driven clutch between the crankshaft and the driving shaft, the controller comprises circuitry that controls the engine, the motor generator, and the clutch, and the circuitry is configured to execute:
- a first starting process that starts, when starting the engine under a condition in which a system shaft torque is less than a shaft torque determination value, combustion in the engine after increasing an engine rotation speed to a motor rotation speed by engaging the clutch, the system shaft torque being a shaft torque of the driving shaft, the engine rotation speed being a rotation speed of the crankshaft, and the motor rotation speed being a rotation speed of the driving shaft;
- a second starting process that starts, when starting the engine under a condition in which the system shaft torque is greater than or equal to the shaft torque determination value, combustion in the engine after the crankshaft starts to be rotated by engaging the clutch, the combustion being started before the engine rotation speed reaches the motor rotation speed; and
- a setting process that sets the shaft torque determination value to be larger as an oil temperature becomes lower, the oil temperature being a temperature of hydraulic oil of the clutch.

2. The controller according to claim 1, wherein the hybrid electric vehicle includes a driven wheel and a transmission mechanism, the transmission mechanism being located on a torque transmission path between the motor generator and the driven wheel, and the circuitry is configured to set the shaft torque determination value based on an estimated input shaft rotation speed in the setting process, the estimated input shaft rotation speed being an estimated value of a rotation speed of an input shaft of the transmission mechanism if the engine is started with the second starting process.

3. The controller according to claim 1, wherein the circuitry is configured to set the shaft torque determination value to be greater in the setting process when an estimated torque capacity is greater than a torque capacity determination value than when the estimated torque capacity is less than or equal to the torque capacity determination value, the estimated torque capacity being an estimated value of a torque capacity of the clutch if the engine is started with the second starting process.

4. A control method for a hybrid electric vehicle, wherein the hybrid electric vehicle includes an engine and a motor generator as a power source, the engine including a crankshaft, and the motor generator including a driving shaft, the hybrid electric vehicle further includes a hydraulically-driven clutch between the crankshaft and the driving shaft, and the control method comprises:

starting, when starting the engine under a condition in which a system shaft torque is less than a shaft torque determination value, combustion in the engine after increasing an engine rotation speed to a motor rotation speed by engaging the clutch, the system shaft torque being a shaft torque of the driving shaft, the engine rotation speed being a rotation speed of the crankshaft, and the motor rotation speed being a rotation speed of the driving shaft;

starting, when starting the engine under a condition in which the system shaft torque is greater than or equal to the shaft torque determination value, combustion in the engine after the crankshaft starts to be rotated by engaging the clutch, the combustion being started before the engine rotation speed reaches the motor rotation speed; and setting the shaft torque determination value to be larger as an oil temperature becomes lower, the oil temperature being a temperature of hydraulic oil of the clutch.

\* \* \* \* \*